United States Patent Office 2,819,887
Patented Jan. 14, 1958

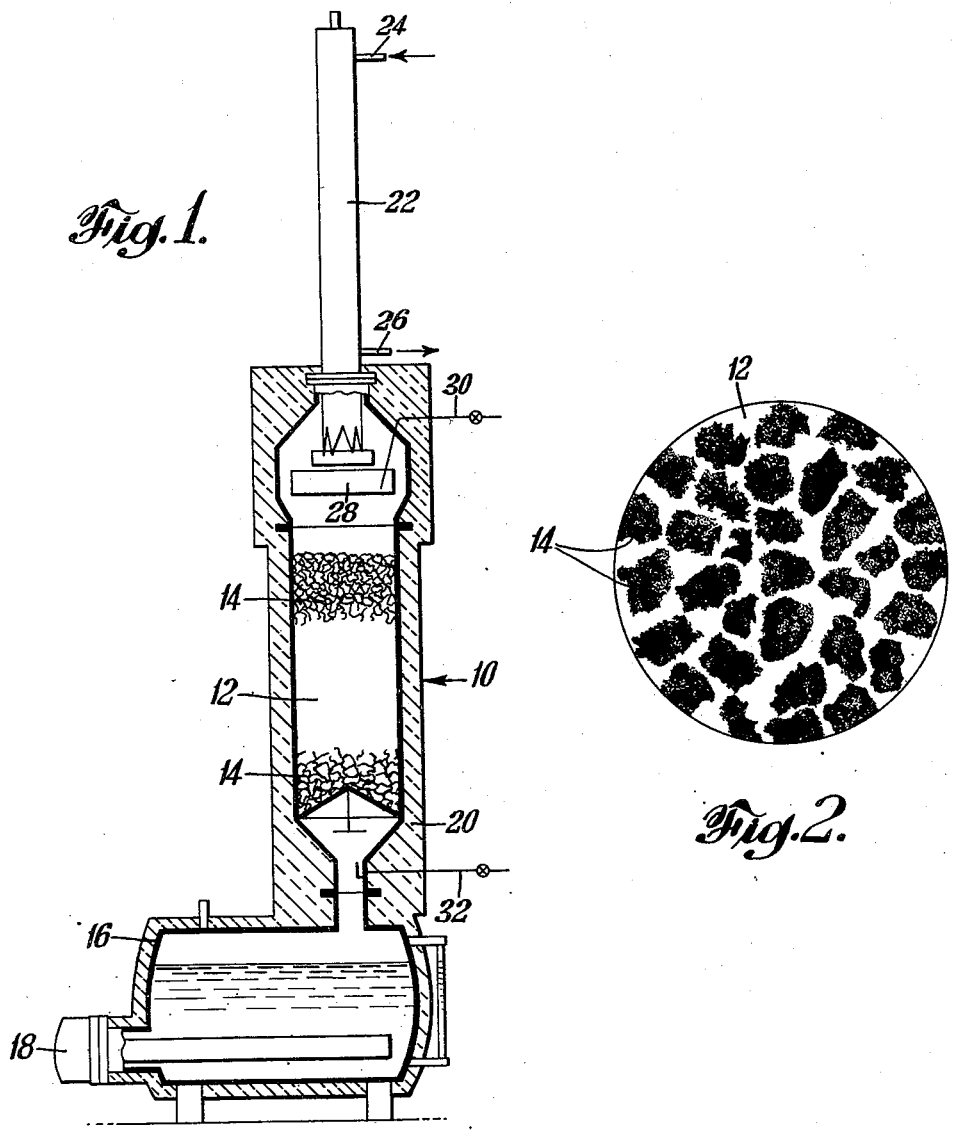

2,819,887

LIQUID-GAS CONTACTING APPARATUS

William G. Eversole, Kenmore, Tudor L. Thomas, Snyder, and George L. Ribaud, Buffalo, N. Y., assignors to Union Carbide Corporation, a corporation of New York Application February 17, 1954, Serial No. 410,946

2 Claims. (Cl. 261—94)

The present invention relates to a novel liquid-gas contacting apparatus of the packed column type.

Heretofore, many types of liquid-gas contacting apparatus have been disclosed for use in commercial absorption and rectification operations, but none has satisfactorily and efficiently solved the major problems encountered. The efficiency of such apparatus has long been known to depend upon the characteristics of the packing employed. Prior packings have been unable to satisfactorily eliminate channeling of the down-flowing liquid, and all of such packings, however efficient in small-diameter columns, lose their efficiency as the diameter of the apparatus is increased.

There are certain essential characteristics that a column packing must possess if it is to be used effectively in both small and large diameter columns, i. e., if the packing is to have a high efficiency which is essentially independent of the diameter of the column. The packing must regulate the downward flowing liquid in such a manner that this liquid presents a very thin film to the rising countercurrent vapor. The packing must also be able to maintain a uniform liquid and vapor distribution over the entire cross-section of the column and this distribution must be uniform down to the dimensions of the packing itself such that each piece of packing always handles its proportionate share of the liquid and vapor. Any lateral maldistribution of liquid due to one section of the packing increasing the liquid which it handles at the expense of the liquid of another section of the packing will adversely affect the rectification efficiency of both sections of the packing. Such maldistribution of the liquid not only reduces the rapid mass transfer obtained with thin liquid films, but equally important, requires that the section with an excess of liquid handles less vapor flow and consequently that section is further depleted of its vapor flow to receive increased liquid. Such a condition prevents the liquid and the vapor from being completely mass-equilibrated, thereby resulting in poor column performance. Very poor results obtained using the common column packings in large diameter rectification columns are attributed to this lateral maldistribution and liquid channeling.

Surface tension forces require that a liquid tends to reduce its liquid-vapor interface to a minimum. In the common column packings, therefore, the liquid, instead of spreading itself out into a very thin film over the entire surface of the packing as is required for efficient rectification, is contracted by its surface forces into thick films and liquid rivulets. In large diameter columns these small liquid streams combine and gradually build up liquid channels of considerable magnitude, always reducing their surface area under the influence of the surface tension forces. This results in very poor column efficiencies and is known as "liquid channeling" of the down-flowing liquid.

It is, therefore, the prime object of the present invention to provide liquid-gas contacting apparatus containing a packing having characteristics, such as enumerated above, which will accomplish uniform lateral distribution of liquid therein, and which will allow the liquid to present a very thin film to the rising gas thereby permitting efficient liquid-gas contact.

Other aims and advantages will be apparent from the following description and appended claims.

In the drawing:

Fig. 1 is an elevational sectional view of liquid-gas contacting apparatus, of the reflux rectification type, embodying the invention; and Fig. 2 is a plan view showing pieces of packing employed in apparatus of the invention.

In accordance with the present invention liquid-gas contacting apparatus is provided containing a column packed with porous material having pores of between 10 and 400 microns in radius passing entirely through the particles and interconnecting in all directions in a continuous network.

It has been found that porous packing, having particles with pore radius between 10 and 400 microns, utilizes the surface tension forces of the down-flowing liquid to maintain a thin film about the surface of the particles which eliminates channeling regardless of the diameter of column employed. This is accomplished by these same surface forces to maintain thin liquid films and eliminate channeling by means of a "wicking" action, thus enabling high packing efficiencies to be maintained in large diameter columns. When a liquid tends to form a thicker film or liquid rivulets in one section of the packing at the expense of another section, as is the case with non-porous packings, the "wicking" action of the porous packing draws the liquid back and maintains a uniform liquid distribution. The differences in liquid distribution and channeling between a non-porous and a porous packing can be illustrated by the following analogy. The action of liquid flowing over a non-porous packing is analogous to water flowing rivulets down a car windshield, while the phenomenon occurring when employing a porous packing is similar to that which occurs when water is poured on a blotter where it distributes itself evenly in all directions and runs down in a thin external film.

Porous packings have all of the previously-enumerated essentials of a good column packing provided that the packing has the proper pore size correlated to the physical properties of the liquids being rectified, and, provided further, that the liquid wets the packing. By the action of the capillary forces ("wicking" action) in the pore, these porous packings successfully maintain: (1) a thin external liquid film for efficient liquid-vapor mass transfer and (2) uniform liquid distribution without liquid channeling. These inherent properties enable the porous packings to surpass the prior packings in efficiency and in the ability to maintain this efficiency in large diameter columns.

It has been discovered that liquid-gas contact apparatus containing porous packing as disclosed above are very efficient in operation. It is to be understood that, within a 10–400 micron range of pore radii, a relatively efficient liquid distribution will be obtained with all liquid which "wet" the packing. However, since the physical characteristics of the liquid (surface tension, density, and viscosity) affect the optimum pore size required for a given application, the optimum pore radius (within the range of 10–400 microns) chosen for any given application will depend upon the liquid to be employed. Each liquid mixture, according to its surface tension, viscosity, and density, requires a packing with pores within a definite and narrow range of pore radii in order to maintain the best possible liquid distribution and maximum efficiency independent of column diameter. The lower the surface tension and viscosity of the liquid, the smaller are the pores that are required to maintain this maximum efficiency. For example, liquids with physical properties similar to water require an effective pore radius somewhat in excess of 100 microns for optimum efficiency; for liquids similar to acetone and to a heptane-methylcyclohexane mixture an effective pore radius somewhere in the range of 30–100 microns is needed. For liquids of higher viscosity, an effective pore radius of more than 100 microns (200–400 microns) will be needed; and for liquids less viscous and with lower surface tension than acetone, an effective pore radius of 10–70 microns must be used for maximum effectiveness. Only in this range of optimum pore radius for a given liquid is (1) the efficiency a maximum, (2) the liquid distribution a maximum, and (3) the efficiency independent of the column diameter. Although a specific and narrow range of optimum pore radius will provide the best column performance for a specific liquid, the actual usable range of pore radii is broader (10–400 microns).

Porous packing may be made of any suitable materials of construction, such as bonded alumina or silica, sintered powdered metal, or similar materials, provided that the final packing consists of interconnecting continuous capillaries of the proper diameter to give maximum efficiency with liquids being rectified and provided that the total interior pore volume is sufficient to handle liquid flow properly. The effective pore radius is determined for porous packings of various porosities with the aid of a mercury porisimeter, such as disclosed in J. Am. Chem. Soc., 73, 3155 (1951). The distribution of pore radii within a given material is plotted as the volume of those pores within a very narrow pore range of pore radii ($\Delta v/\Delta r$) against pore radius. The effective pore radius is then selected as that radius which has the greatest volume, i. e., the radius where $\Delta v/\Delta r$ is a maximum.

As above stated, in the case of most liquids, any packing having an effective pore radius in the range 10–400 microns will function adequately; however, to obtain the maximum efficiency and to maintain this maximum efficiency independent of the diameter of the column used, an effective pore radius should be used which, in combination with the physical properties of the liquid being used, gives a maximum lateral distribution to the downward flowing liquid. The optimum pore radius for a liquid of given physical properties (surface tension, viscosity, and density) can be determined by testing a series of porous packings having effective radii over the range of 10–400 microns, such as samples of packing with each of the following effective pore radii: 30, 60, 100, 150, 200, 300, and 400 microns.

The optimum pore radius for maximum separation efficiency with a given liquid mixture can be determined using the above mentioned series of porous packings in either of two ways: (1) the given liquid mixture may be rectified in a column with each of these packings successively; then the packing with the greatest efficiency in accomplishing the separation is the one with the optimum pore radius, and/or (2) the coefficient of lateral liquid distribution may be determined as outline below for the given liquid mixture with each of the porous packings. The packing giving the maximum K-value for this liquid mixture will give the maximum separation efficiency when used in a column.

It is to be understood that the particles of porous packing are to be arranged in the packed section of the column in a completely random manner. If this condition is not obtained a uniform orientation of the packing will cause excessive liquid to flow through the packing in the direction of the orientation and result in a serious reduction in efficiency.

A liquid distribution test has been devised to measure the relative lateral distribution of a given liquid with each of the packings in the aforementioned series of porous packings. This liquid distribution test consists of running the liquid at a definite rate through a rectangular packed section, 2 inches thick by 12 inches long and packed to a height of 7 inches. The bottom of the packed section is divided into eight segments of equal area (2 in. x 1½ in.) from which the distribution liquid is collected and the volume measured. The segments are numbered consecutively from 1 to 8 along the length of the packed section. The liquid is fed in a single stream onto the top of the packing directly in the middle of the column above the partition separating collecting segments 4 and 5. The distributed liquid is collected from each of the 8 collecting segments and the volume measured. In order to make the data more usable, a coefficient of lateral liquid distribution, K, is calculated in the following manner:

$$K = 3.60\left[a + h + \frac{b+g}{10} + \frac{c+f}{100} + \frac{d+e}{1000}\right]$$

where $a$, $b$, $c$, $d$, $e$, $f$, $g$, and $h$ correspond to the percentage of the total liquid feed collected in segments 1, 2, 3, 4, 5, 6, 7 and 8 respectively. This method of calculation of K emphasizes the amount of liquid distributed to the outermost segments. In order to allow perfect distribution to be represented by a K value of 100 a constant (3.60) is included in the equation as a normalizing factor. From the above-stated series of porous packings with varying effective pore radii, that packing which gives the highest K value for a given liquid or liquid mixture represents the effective pore radius which is necessary to maintain the maximum lateral distribution of this given liquid. It has been found that for a given liquid mixture, the effective pore radius which gives the maximum lateral distribution also gives the greatest separation efficiency.

Referring to the embodiment shown in Figure 1 of the drawing, a reflux type rectification tower 10 is provided containing a packed section 12 of porous particles 14, having internal pores with an effective pore radius somewhere in the range between 10 and 400 microns (depending on the physical properties of the liquid being used). A kettle 16, having a heat element 18, is provided at the lower end of the column for vaporizing the liquid to be rectified. Thermal insulation 20 is provided around the entire column and kettle. The condenser 22 is provided at the upper end of the column with cooling fluid inlet means 24 and outlet means 26. A reflux distributor plate 28 is provided between condenser 22 and packed section 12. Conduits 30 and 32 are provided for extract examples at both the upper and lower portions of the packed section 12.

Rectification columns, such as are shown in Figure 1, were operated with porous packings made of various materials, such as bonded alumina, bonded silica, and bonded silicon carbide, and with packings having a wide range of effective pore radii, from less than 6 to over 600 microns. Using a heptane-methylcyclohexane liquid mixture with 4 x 8 mesh porous packing, the optimum pore radius for this liquid mixture was found to be about 100 microns. With this liquid mixture and a 4 x 8 mesh porous packing with an effective pore radius of about 100 microns, the H. E. T. P. at a superficial vapor velocity of 10 cm. per sec. and at total reflux was found to be 2.6, 2.6, and 2.7 cm. in 2.0, 3.0, and 8.0 inch diameter columns, respectively. The following table further illustrates the advantages porous packing of the proper effective pore radius has over the commonly known and currently used column packings with regard to the ability of the packing to maintain separation efficiencies essentially constant as the column diameter is increased.

TABLE I

*Effect of column diameter on packing efficiencies using heptane-methylcyclohexane mixtures at superficial vapor velocities of 20 cm./sec. at total reflux*

| Packing | H. E. T. P. (cm.) in Columns of Dia. | | | | |
|---|---|---|---|---|---|
| | 1 in. | 2 in. | 3 in. | 4 in. | 6 in. |
| Porous, 100 micron, 4 x 8 mesh | 3.4 | | 3.2 | | 3.6 |
| Spiral wound wire, rectangular sections, 0.10 in | 1.6 | 2.3 | | | |
| Spiral wound wire, rectangular sections, 0.175 in | 2.9 | 3.1 | | | |
| Gauze ring packing, 100 mesh, ⅛ in | 1.1 | 1.4 | 1.7 | 2.2 | |
| Cylindrical protruded packing, B, ¼ in | | 3.0 | | 4.3 | 5.8 |
| Cylindrical protruded packing, A, ⅜ in | 3.4 | 4.7 | | 5.1 | 12.2 |
| Wire mesh saddles, 100 mesh, ¼ in | 3.1 | 4.3 | 5.0 | 5.8 | 7.4 |
| Raschig rings, ceramic, ¼ in | 11.9 | | 13.7 | | |

A 12 inch diameter column packed with porous packing of about 100 micron effective pore radius was run with a liquid mixture requiring an effective pore radius in the range of 20 to 50 microns at a superficial vapor velocity of 1 ft. per second at total reflux, and an H. E. T. P. of 4.4 cm. was obtained. It can, therefore, be seen that even under the non-optimum conditions of too large pore size for the liquid being used, the porous packing maintains high separation efficiencies, as may be seen from the H. E. T. P. value obtained.

Various porous packings having a wide range of effective pore radii (less than 6 microns to over 600 microns) have been tested in the separation of heptane-methylcyclohexane mixtures in 1 and 3 inch diameter columns. From the following table it can be seen that the optimum pore radius for this liquid mixture is approximately 65 microns, and that above and below this point the separation efficiency falls off rapidly, and even more rapidly the larger the column diameter.

TABLE II

*Effective pore radium vs. packing efficiency using heptane-methylcyclohexane mixtures at superficial vapor velocities of 20 cm./sec. at total reflux 4 x 8 mesh porous packings*

| Effective Pore, Radius, Microns | H. E. T. P. (cm.) in Columns of Diameter | |
|---|---|---|
| | 3-inch | 1-inch |
| Less than 6 | 3.3 | 6.1 |
| 15 | 3.6 | 3.7 |
| 20 | 3.0 | 3.7 |
| 30 | 2.9 | 2.8 |
| 50 | 2.8 | 3.3 |
| 65 | 2.7 | 2.7 |
| 100 | 3.4 | 3.2 |
| 105 | 3.8 | 4.0 |
| 340 | 3.8 | 4.7 |
| 390 | 5.0 | 5.8 |
| 640 | 5.9 | 7.2 |

It is, of course, understood that, as in the case of other packing materials, the gross size of the packing particles affects the separating efficiency and throughput of the column. For example, if the overall size of the porous packing particles is increased, there is a decrease in separating efficiency and an increase in the throughput of the column. Therefore, the particle size employed must be a compromise between the desired separation efficiency and the desired throughput. The size of porous packing particles must be sufficiently great that an interconnecting network of open capillaries through the porous particles is provided. Porous packings having particle sizes ranging from 12 mesh to 0.5 inch have been successfully employed.

What is claimed is:

1. Apparatus for bringing a gas and a liquid into contact comprising an enclosed contact chamber, means positioned near the top of said chamber for providing liquid to flow down through said chamber, means positioned near the base of said chamber for providing for the flow of gas up through said chamber, and particles of porous packing material positioned in a random distribution in said contact chamber, said material having pores passing entirely through said particles in substantially all directions, interconnecting in a continuous network and having substantially uniform radii selected at between about 10 and 400 microns.

2. In a gas-liquid contacting column for contacting a downwardly-flowing liquid and an upwardly flowing gas, a randomly distributed packing of particles of porous material having pores passing entirely through said particles in substantially all directions, interconnecting in a continuous network and having substantially uniform radii selected at between about 10 and 400 microns and offering a substantially constant and equal lateral distribution of downwardly flowing liquid independent of column diameter.

References Cited in the file of this patent

UNITED STATES PATENTS

| 848,631 | Cellarius | Apr. 2, 1907 |
| 1,654,925 | Drager | Jan. 3, 1928 |
| 2,075,193 | Gerson | Mar. 30, 1937 |
| 2,157,596 | Davis | May 9, 1939 |
| 2,220,641 | Davis | Nov. 5, 1940 |
| 2,470,652 | Scofield | May 17, 1949 |
| 2,554,343 | Pall | May 22, 1951 |
| 2,594,585 | Ridgway | Apr. 29, 1952 |